Aug. 29, 1950     V. MILLS ET AL     2,520,422
CONTINUOUS HYDROGENATION OF UNSATURATED
FATTY ACIDS AND FATTY ESTERS
Filed May 2, 1947     2 Sheets-Sheet 1
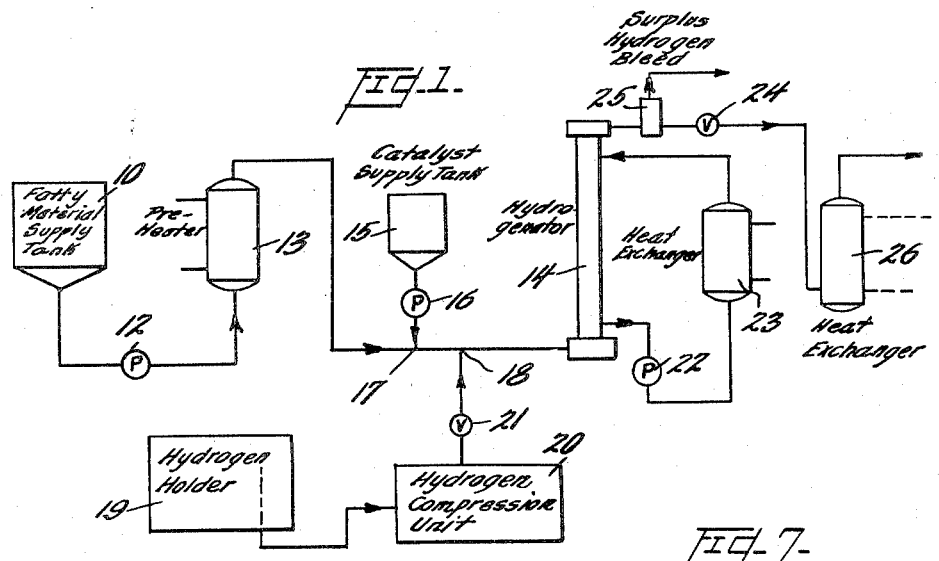
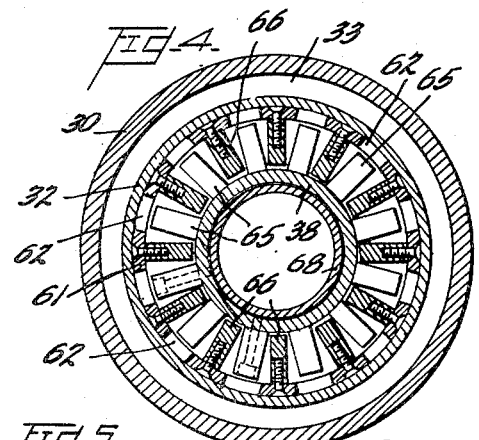
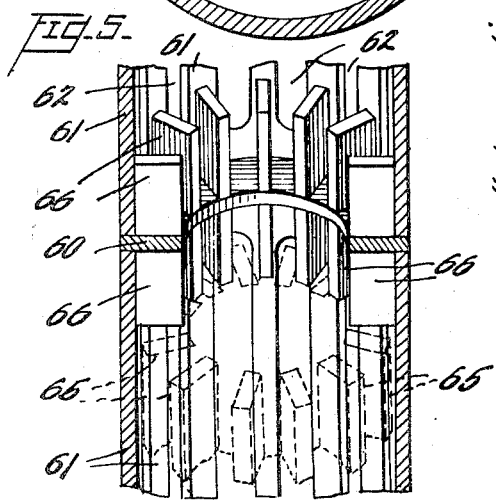
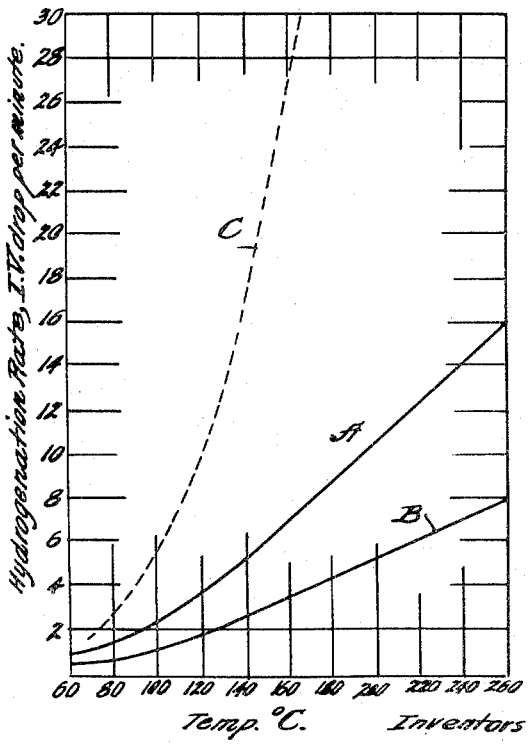
Inventors
Victor Mills
Judson H. Sanders
Harold K. Hawley
By Watson, Cole, Grindle & Watson
Attorneys Aug. 29, 1950     V. MILLS ET AL     2,520,422
CONTINUOUS HYDROGENATION OF UNSATURATED
FATTY ACIDS AND FATTY ESTERS
Filed May 2, 1947     2 Sheets-Sheet 2
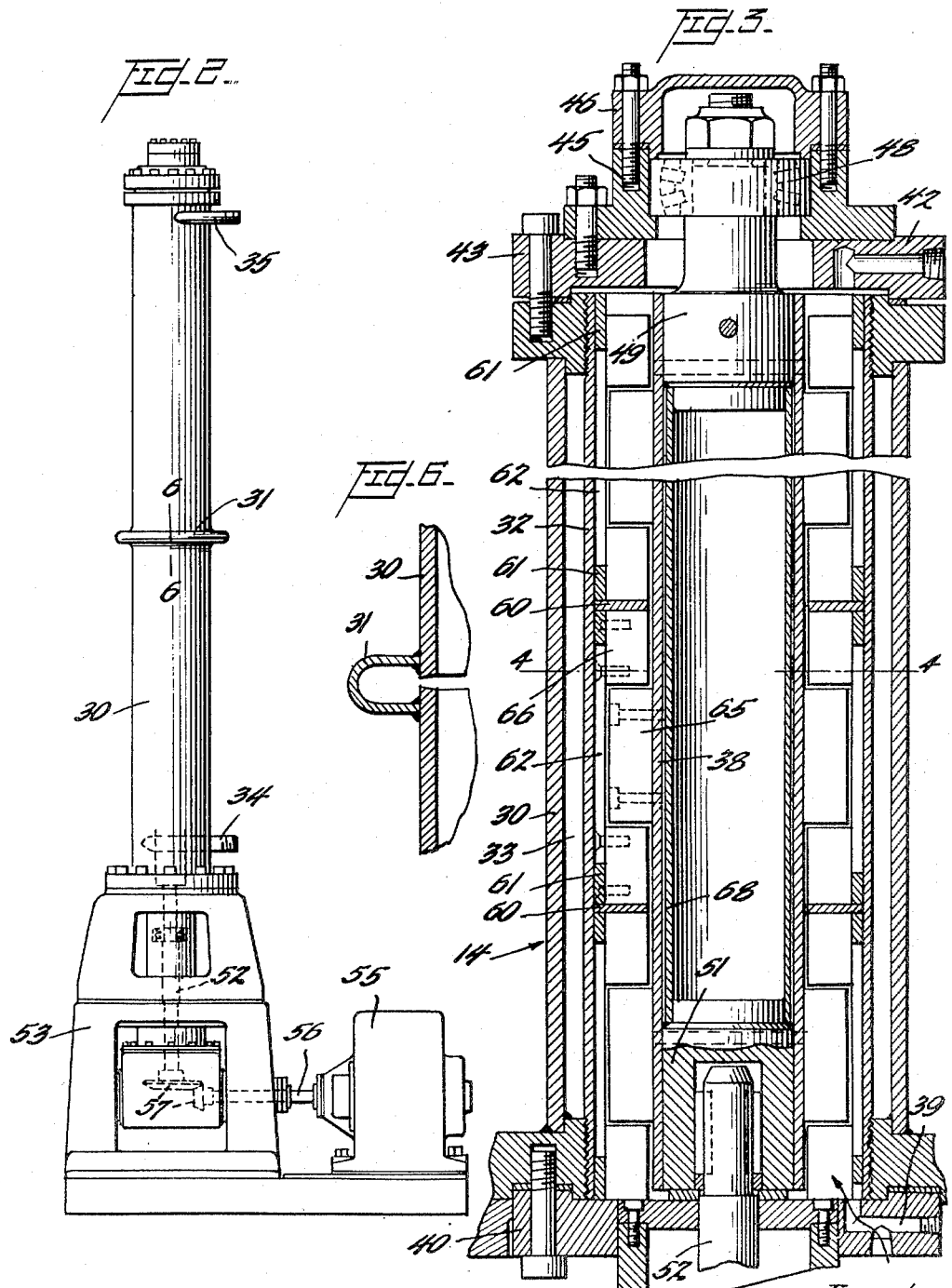
Inventors
Victor Mills
Judson H. Sanders
Harold K. Hawley
Watson, Cole, Grindle & Watson Attorneys Patented Aug. 29, 1950

2,520,422

UNITED STATES PATENT OFFICE 2,520,422

CONTINUOUS HYDROGENATION OF UN-SATURATED FATTY ACIDS AND FATTY ESTERS

Victor Mills, Judson Hair Sanders, and Harold K. Hawley, Cincinnati, Ohio, assignors to The Procter and Gamble Company, Ivorydale, Ohio, a corporation of Ohio Application May 2, 1947, Serial No. 745,660

7 Claims. (Cl. 260—409)

This invention relates to improvements in processes for hydrogenating unsaturated fatty substances such as unsaturated higher fatty acids and their esters. It deals with continuous processes employing a suspension of finely divided catalyst.

A number of different methods have been proposed for the continuous hydrogenation of animal, vegetable, and marine oils and the fatty acids thereof, containing unsaturated fatty acids or fatty acid radicals, for the production of less unsaturated oily or fatty products, mostly for use in the manufacture of edible fat products and in the making of soap. Because of the serious limitations of continuous processes heretofore available, however, batch processes are employed to a very much greater extent for the hydrogenation of glyceride oils in commercial practice today, and none of the available continuous methods to the present applicants' knowledge has the outstanding advantages of the novel process which is herein described and claimed.

Continuous hydrogenation processes which employ a fixed catalyst are mechanically feasible, and are employed to a limited extent commercially. Those which pass the oil as a continuous liquid phase over the fixed catalyst are relatively slow and result in the formation of large amounts of esters of isooleic acid, which have undesirable properties as hereinafter pointed out. Those which pass the oil as a spray or thin film over the fixed catalyst are not adapted to satisfactory control of temperature or of the end-point of the reaction. Other disadvantages are inherent in these processes which employ a fixed catalyst, among these being the gradual deactivation of the catalyst with its continuous use and the consequent non-uniformity of the hydrogenated product, and the necessity for shutting down the equipment periodically to replace or reactivate the catalyst.

Continuous hydrogenation processes have been proposed which employ finely divided catalyst in suspension in the oil, but they have not been designed to utilize and control the very rapid reaction rates which we find highly desirable and feasible in the practice of our invention. They have lacked adequate control of the reaction temperature, which tends to increase due to the exothermic nature of the reaction, and thereby greatly to increase the rate of reaction, thus causing erratic results; also they have lacked suitable provisions for preventing contamination of the product with raw or insufficiently hydrogenated material. Because of these and other defects these processes have not gained acceptance in industry.

The present process is one of those which employs finely divided catalyst in suspension in the oil, rather than a fixed catalyst.

In our process we obtain very high reaction rates, and are able to control these within narrow limits, by a novel combination of processing conditions which includes the use of quite active catalyst, violent mechanically induced agitation accompanied by avoidance of contamination of the product with insufficiently hydrogenated material, and preferably also the continuous removal of at least the greater part of the heat of reaction. As a result we obtain exceptionally high quality hydrogenated products which, because of the excellent end point control made possible by our procedure, are consistently uniform in composition and characteristics.

As compared with glyceride oil hydrogenation methods used heretofore, employing relatively slow reaction rates, we find that the desirable results which attend our process, and which it is our object to obtain, include:

(1) Improved hydrogenated oil or fat quality as a result of relatively short exposure to high temperatures;

(2) Improved plastic properties of edible fats, when partially hydrogenated to any given keeping quality value, due to lessened formation of undesired isooleic acid esters and probably to other factors as well.

(3) Prolonged active life of catalyst as a result of relatively brief contact of the catalyst with such amounts of catalyst poisons as are present in the oil and in the hydrogen;

(4) Savings in amount of catalyst required and/or in the amount of gas which must be purged or bled from the system or which must be repurified to maintain its purity at a high level, because of the greatly reduced amount of carbon monoxide created by decomposition of the oil (particularly when hydrogenation temperatures above 135° C. are employed);

(5) Decreased cost of hydrogenating equipment and buildings to house it, due to the high throughput rate of the oil in process;

(6) Decreased cost of hydrogen gas recirculating equipment due to the rapid and more complete absorption of the gas by the oil under the conditions of the process, and due also to the reliance upon mechanically induced agitation rather than simple gas agitation;

(7) Decreased cost of hydrogen gas manufacturing equipment, and lower operating costs for this equipment, due to a very uniform rate of absorption of hydrogen and to the consequent elimination of peak demands;

(8) Better control of the end-point of the hydrogenation reaction, i. e. of the degree of unsaturation or saturation of the hydrogenated product leaving the process, with consequent improvement in the uniformity of quality of the ultimate product;

(9) Improved flexibility of control of the principal variables, particularly temperature, gas pressure, amount of catalyst, and overall time of hydrogenation;

(10) Improved operating efficiency of industrial hydrogenation plants due to improved control, resulting in accurate scheduling of production at a uniform rate.

As compared with earlier continuous hydrogenation processes, our objects also include providing a faster process, together with the aforementioned attendant advantages, and providing a process wherein objectionable contamination of the finished product with insufficiently hydrogenated raw materials is minimized.

The continuous process of the present invention is generally applicable for the hydrogenation of carbon to carbon double bonds in unsaturated higher fatty acids and their glycerides (mono-, di-, and triglycerides) and their other esters. The invention is expected to find its greatest commercial use in the conversion of unsaturated oils and fats of natural origin to less unsaturated (including completely saturated) glyceride oils and fats, although it may be used equally effectively in the hydrogenation of unsaturated fatty esters derived from petroleum fractions or obtained by other synthetic processes, and also in the hydrogenation of fatty esters derived from various industrial sources, for example the fatty components of tall oil. Among the unsaturated glycerides which may be partially or completely hydrogenated by our process are cottonseed oil, soybean oil, peanut oil, corn oil, linseed oil, coconut oil, olive oil, palm oil, tallow, lard, fish oil, and whale oil, to name but a few. By means of our process hydrogenated products may be made for uses such as base stocks for plastic shortenings, hard stocks for plastic shortenings, margarine fats, fatty materials for soap manufacture, and various hydrogenated fatty derivatives.

A preferred form of apparatus for carrying out our process is illustrated in the accompanying drawings, in which:

Figure 1 is a schematic flow chart showing the principal elements of a typical continuous hydrogenation system;

Figure 2 is a side elevation of a mechanically agitated continuous hydrogenator vessel;

Figure 3 is a vertical section of the vessel shown in Figure 2;

Figure 4 is a horizontal section of the vessel, taken on the line 4—4 of Figure 3;

Figure 5 is a fragmentary vertical section of the inner chamber of this same vessel, showing in perspective some of the hold-back baffles, or stators, and one of the horizontal baffles;

Figure 6 is a fragmentary sectional view taken on the line 6—6 of Figure 2; and

Figure 7 is a graph indicating reaction rates versus temperatures.

The detailed structure of the apparatus illustrated in these drawings forms no part of the present invention, and very favorable results have been obtained with apparatus of quite different design.

Referring to Figure 1, the unsaturated liquid material to be hydrogenated is delivered from supply tank 10 by means of pump 12 through a tubular preheater 13 to and through the hydrogenator 14. A suitable hydrogenation catalyst suspended in a small quantity of a suitable liquid (which may often be a portion of the material to be hydrogenated) is delivered from catalyst supply tank 15 by means of pump 16 either directly into the hydrogenator, or (as shown) into the pipeline which is delivering the main supply of material to be hydrogenated from the preheater to the hydrogenator, for example, at point 17. A continuous supply of hydrogen, or a suitable hydrogen-containing gas, is introduced into the same pipeline at another point ahead of the hydrogenator, for example at point 18, the hydrogen supply being drawn from a suitable reservoir or supply, as illustrated at 19, by means of compressor 20 through a pressure regulating valve 21. While flowing through the hydrogenator 14, the mixture of the liquid material to be hydrogenated, the catalyst, and the hydrogen is subjected to violent agitation to bring these three materials into intimate contact with one another and to bring about a rapid movement of the individual particles of each of the non-liquid phases in contact with the particles of the liquid phase, thus promoting a high velocity of the hydrogenation reactions which occur in this vessel. The heat of reaction which is liberated is preferably (especially when only partially hydrogenating an unsaturated material) completely, or at least for the most part, removed continuously by circulating a cooling medium through a jacket surrounding the reaction space in the hydrogenator, the cooling medium being circulated by means of pump 22, and the heat being removed from the cooling medium in heat exchanger 23. The reaction mixture passing through hydrogenator 14 is maintained at superatmospheric pressure, and this pressure may conveniently be regulated by means of the adjustable relief valve 24 in the outlet line leading from the hydrogenator. If a surplus of hydrogen is used, over that which reacts with the oil and that which remains dissolved in the liquid leaving the hydrogenator, this surplus may be separated and bled off through the top of small tank 25. The hydrogenated material leaving the hydrogenator is cooled by means of heat exchanger 26, and any remaining gas which has come out of solution subsequent to the drop in pressure at valve 24 is then separated from the hydrogenated material, and the catalyst is removed by filtration or by any other convenient method in apparatus not illustrated in the drawing.

The hydrogenator 14 of the system just described may be constructed as shown more particularly in Figures 2 to 6, inclusive, in which is illustrated a preferred type of hydrogenating apparatus. Thus the hydrogenator may comprise an outer jacket 30, provided with an expansion coupling 31 to relieve strains caused by temperature changes, and an inner cylinder 32, the jacket and cylinder defining an annular space 33 within which is circulated a fluid coolant, the inlet and outlet conduits for the coolant being shown in Figure 2 at 34 and 35 respectively. A hollow shaft 38, of substantially less diameter than cylinder 32, is disposed coaxially within the cylinder and supported for rotation about its vertical axis, shaft 38 and cylinder 32 defining an annular reaction passage in which the mixture of the liquid fatty material, the hydrogen, and the catalytic agent, is intensely agitated while flowing in an upward direction, being introduced through an inlet passage 39 formed in an annular plate 40 at the lower end of cylinder 32, and discharging through an outlet passage 42 in an annular plate 43 at the upper end of cylinder 32.

The hydrogenator is closed at its upper end by a cap structure comprising plate 43 and closure members 45 and 46, the several parts being bolted together as shown more particularly in Figure 3. A radial thrust bearing 48, seated in member 45 and retained in position by member 46 engages and supports a shaft 49 which extends within and is secured to the hollow shaft 38, whereby the latter is journaled for rotation. Received within and secured to shaft 38 at its lower end is a coupling element 51; a drive shaft 52, disposed coaxially of shaft 38, extends within and is secured for rotation with coupling element 51. Drive shaft 52 is journaled for rotation in the supporting base structure indicated generally at 53, the hydrogenator being suitably mounted on this base structure. A motor 55 having a shaft 56 drives shaft 52 through bevel gearing 57, whereby the hollow shaft 38 is rotated rapidly; variable speed gearing may be incorporated in the motor housing in order that the speed of shaft 38 may be appropriately selected. It will be appreciated that the details of this construction form no part of the instant invention and may be varied widely.

The annular reaction passage between shaft 38 and cylinder 32 is divided into a series of compartments or reaction zones by means of a plurality of horizontally disposed annular disks or baffles 60, the baffles being spaced longitudinally of the hydrogenator. The outer diameter of each baffle 60 is such that the baffles fit snugly within cylinder 32, the inner diameter being slightly larger than the outer diameter of shaft 38, so as to afford slight mechanical clearance therebetween. The reacting materials flowing upwardly are thus caused to flow through the restricted annular passages defined between shaft 38 and baffles 60 in moving from each compartment or reaction zone the next higher zone, retention of the materials in each zone for a substantial length of time being assured. "Channeling," or too rapid movement of insufficiently reacted materials through and out of the hydrogenator, is thereby avoided. The baffles 60 may be retained in proper spaced relation by a series of spacing sleeves, the several sleeves fitting snugly within cylinder 32, so that each of the baffles is clamped between an adjacent pair of sleeves 61. Each of the sleeves 61 may be formed with longitudinally extending slots 62, as shown more particularly in Figures 3 and 5, to reduce the weight of the sleeves and to increase the heat transfer surface and the volume and capacity of the several reacting zones. An efficient hydrogenator may be provided with as many as 11 baffles, or even more, so as to provide 12 or more reacting zones, but the number of zones may be varied widely.

In order to effect intense agitation of the material, each zone may be provided with a series of agitator blades 65, and with cooperating stator blades or stationary baffles 66 located above and below the agitator blades. The agitator blades 65 are disposed radially of and are bolted securely to the hollow shaft 38 in circumferentially spaced relation, one such series of agitator blades being shown in dotted lines in Figure 5. In order to prevent leakage of the reacting materials past the securing bolts to the interior of the shaft 38, a sleeve 68 extending within and over the major portion of the length of shaft 38, is welded to the latter at each end. The circumferentially spaced stator blades 66 are likewise disposed radially of the axis of shaft 38, and are bolted or are otherwise secured to the sleeves 61 adjacent each of the annular disks 60, preferably intermediate the slots 62 formed in sleeve 61, as shown in Figure 5. It will be observed that each reaction zone is provided with one series of agitator blades 65 and two series of cooperating stator blades 66, the latter acting to resist continuous swirling movement of the reacting materials about shaft 38 and otherwise serving to increase the degree of agitation imparted to the materials. Preferably, blades 65 and 66 in adjacent series are so dimensioned as to afford only the necessary mechanical clearance between each other; similarly, only mechanical clearance is afforded between the stator blades 66 and the shaft 38 and between the agitator blades 65 and the sleeves 61.

In the particular hydrogenator illustrated, we effectively avoid undue contamination of the finished product with raw oil or with insufficiently hydrogenated oil by a combination of two provisions; first, the relatively long passage between the walls of cylinder 32 and the central shaft 38 through which the reaction mixture passes on its way from the entrance to the exit of the hydrogenator, the flow through this passage being interrupted repeatedly by a series of transverse agitators separated from one another by a corresponding series of stator blades tending to break up swirling induced by the agitators; and second, the horizontal circular baffles, elements 60, which subdivide the reaction zone into a plurality of lesser zones each communicating with the adjoining one by means of a passage of greatly restricted cross-sectional area. The importance of these factors will be pointed out later on.

When the process of the present invention is in operation under typical conditions, with the flow of oily liquid, suspended catalyst, and hydrogen passing at uniform rates in contact with one another through the reaction vessel under conditions of extreme turbulence, the temperature of the liquid is established at a chosen value (as hereinafter discussed) by adjusting the pressure of the steam or the temperature and rate of flow of other heating medium through the jacket of the oil preheater, and this temperature is maintained with but little or no rise as the oil passes through the hydrogenator by controlling the temperature or rate of flow of the water or other cooling medium through the jacket surrounding the hydrogenator. When a relatively small overall iodine value drop is being brought about and consequently the heat liberation is small in amount, it may not be necessary or desirable to remove more than about two thirds of the heat of reaction, although when the total iodine value drop is 10 units or more we prefer to keep the temperature of the liquid practically constant as it progresses through the reaction vessel, with a preferred maximum temperature rise of not more than 10° to 15° C. An exception to this preferred temperature control is in the complete hydrogenation of a material, in which case the control of the end-point is relatively simple and the temperature may be allowed to rise if desired.

The degree of reaction, or completeness of hydrogenation (as measured from time to time by determining the iodine value, or the refractive index, or the congeal point or the titer, or other index, of samples of the hydrogenated liquid withdrawn from the system after the reaction has ceased) may conveniently be controlled by regulating the rate of introduction of the liquid to be hydrogenated. As this liquid rate is varied one may simultaneously and correspondingly vary the rates of feed of the catalyst slurry and the hydrogen, thus maintaining constant proportions of catalyst and hydrogen in relation to the liquid feed rate, or one may alternatively keep one or both of these secondary feed rates constant, or vary it independently of the liquid feed rate, thus gaining an independent or supplementary control over the extent of the hydrogenation which occurs. The amount of hydrogen which is supplied to the hydrogenator should of course be adequate for the degree of hydrogenation desired, and may conveniently be somewhat in excess of this amount in order to insure utilizing the maximum hydrogenating capacity of the hydrogenator.

To facilitate an understanding of the invention its employment in a number of typical hydrogenations will be described.

*Example 1.*—Refined and bleached prime cotton seed oil containing 0.04 per cent of its weight of nickel, in the form of a suspension of a finely divided promoted nickel catalyst having an activity of 5.7 units (as hereinafter explained), was pumped at a rate of 2.44 pounds per minute through a preheater, in which its temperature was raised to 166° C., and thence into and through a small sized continuous hydrogenator resembling the one shown in Figures 2 to 6 except that it had only three circular baffles, elements 60. The internal dimensions of this hydrogenator were a diameter (element 32) of 4 inches, a height of 60 inches, and a free space volume of 353 cubic inches (of which about 78% is occupied by oil and 22% by gas under average operating conditions); and the speed of its agitator was 1000 R. P. M. The arrangement of the equipment was like that shown in Fig. 1, except that the catalyst feed tank 15 was dispensed with, the catalyst being added to the oil in supply tank 10 which was provided with a mechanical agitator. A stream of electrolytic hydrogen, amounting to about 1.45 cubic feet per minute under standard conditions (all gas volumes will be expressed in terms of standard conditions unless otherwise stated), was introduced at a pressure of 50 pounds per square inch (all pressures are superatmospheric gauge pressures) into the oil feed line at a point near its point of entry into the hydrogenator. A sufficient flow of cooling water was passed through the jacket of the hydrogenator to keep the outlet hydrogenated oil temperature at 168°±1° C. A bleed of 0.25 cubic foot per minute of surplus hydrogen was withdrawn from the oil just beyond its outlet from the hydrogenator, the oil was then reduced in pressure to a few pounds above atmospheric, was then passed through a tubular cooler in which its temperature was reduced to about 60° C., was then passed through another vented tank from the top of which a small amount of unconsumed gas was withdrawn, and the substantially gas-free oil was then passed through a filter press for the removal of catalyst.

By this process the cottonseed oil was reduced in iodine value from about 110 to 75.7 in 3.4 minutes, the average hardening rate being 10.2 iodine value units drop per minute. A one gram sample of this hydrogenated oil when subjected to a standard oxygen absorption test absorbed 3 c. c. of oxygen in 24 hours. The consistency of the product of this example, when made into plastic shortening, was determined by blending 6 parts of substantially fully hydrogenated cottonseed oil, called "hard stock," with 94 parts of the 75.7 I. V. product, plasticizing this blend by chilling and agitating in a known manner under standardized conditions and measuring the consistency of the resulting plastic shortening by means of a standardized penetration test.

For purposes of comparison another portion of the same cottonseed oil and catalyst slurry was hydrogenated by the conventional batch method at 165° C., atmospheric pressure, with moderate mechanical agitation, to the same degree of consistency, similarly determined. The time required in the batch method to reach this common consistency value, which occurred when the iodine value reached 81.0 (over 5 I. V. higher than in the case of the continuous process), was 35 minutes. When subjected to the same oxygen absorption test a one gram sample of the batch-hydrogenated oil absorbed the 3 c. c. of oxygen in 18 hours.

Thus the fat processed by our rapid continuous process had an indicated keeping quality about 33 per cent better than that of the fat of comparable consistency made from the same oil by a conventional batch method, this being due to a lower linoleic content in the former. It was possible to reach this lower linoleic content in our process by minimizing isooleic formation, with its attendant firming effect.

Another conventional (though abnormally rapid) comparative batch run was made on another portion of the same oil, the temperature again being 165° C. but the pressure being 50 lbs. (the same as in the continuous run). To reach the same consistency value (adjusting all actual results to this comparable basis by applying well established correction factors) the time required was 9 minutes, the iodine value of the hydrogenated oil was 80.0 and its 3 c. c. oxygen absorption time was 19 hours. This product thus was also inferior to the one made by our process.

*Example 2.*—With the same apparatus as in Example 1, except that the agitator speed was 580 R. P. M., another lot of refined and bleached cottonseed oil was hydrogenated to an iodine value of 74.5, under the following conditions:

| | |
|---|---|
| Oil and catalyst supply rate pounds per minute__ | 1.76 |
| Amount of Ni in the oil per cent by weight__ | 0.1 |
| Activity of catalyst_____units__ | 5.4 |
| Hydrogen inlet rate_____C. F. M__ | 1.2 |
| Surplus hydrogen outlet rate____C. F. M__ | 0.3 |
| Hydrogen pressure_____p. s. i__ | 150 |
| Oil inlet temperature_____°C__ | 110 |
| Oil outlet temperature_____°C__ | 112±1 |
| Av. time of oil in hydrogenator minutes__ | 4.8 |
| Total I. V. drop_____ | 35.5 |
| I. V. drop per minute, average_____ | 7.4 |

When blended with 6.25% of its weight of substantially fully hydrogenated cottonseed oil (iodine value about 8) and plasticized as explained in the fourth from last paragraph of Example 1, the product thus produced had a penetration value of 232 units at 70° F. and this value increased (i. e. the product softened) 78 units when warmed to 90° F.

For comparison another portion of the same oil and catalyst was subjected to rapid batch hydrogenation at a temperature of 110° to 113° C., at a pressure of 150 p. s. i., employing mechanical agitation, to a slightly lower iodine value than in the continuous process (specifically, to 74.1 iodine value), the time required being 19 minutes, and was blended with enough hard stock (7%) to produce a plasticized shortening having the same 70° F. penetration value (232 units) as that produced from the continuously hydrogenated material. The penetration value of this second lot of batch-hardened shortening increased 97 units upon warming from 70° F. to 90° F. and it was undesirably "ribby" or uneven in consistency due to a higher content of isooleic acid esters (5.7% isooleic in combined fatty acids in continuous product as compared with 8.6% in the batch product).

The oxygen absorption time of the continuously hardened oil was 14 hours, and that of the batch-hardened oil was also 14 hours.

Thus the shortening produced from continuously hydrogenated oil had a smoother consistency than that made by the batch process, and a uniformity of consistency over a range of temperatures commonly encountered in kitchen and bakery practice such that it varied only 80 per cent as much as the batch-hardened lot.

*Example 3.*—With the same apparatus as in Example 1, except that the agitator speed was 580 R. P. M. and that there were 11 baffles, elements 60, a lot of refined and bleached coconut oil was substantially fully hydrogenated to an iodine value of 0.5, under the following conditions:

| | |
|---|---|
| Oil and catalyst supply rate pounds per minute__ | 1.03 |
| Amount of Ni in the oil per cent by weight__ | 0.1 |
| Activity of catalyst_____units__ | 5.6 |
| Hydrogen inlet rate_____C. F. M__ | 0.42 |
| Surplus hydrogen outlet rate_____C. F. M__ | 0.3 |
| Hydrogen pressure_____p. s. i.__ | 250 |
| Oil inlet temperature_____°C__ | 165 |
| Oil outlet temperature_____°C__ | 165 |
| Av. time of oil in hydrogenator___minutes__ | 8.1 |
| Total I. V. drop_____ | 8.3 |
| I. V. drop per minute, average_____ | 1.02 |

This is exceptionally fast hardening to such a very low iodine value, four to five hours normally being required in conventional batch practice when conducted at substantially atmospheric pressure and at 165° C.

*Example 4.*—With the same apparatus as in Example 2 a lot of refined and bleached soybean oil was hydrogenated to an iodine value of 82.8, under the following conditions:

| | |
|---|---|
| Oil and catalyst supply rate pounds per minute__ | 2.14 |
| Amount of Ni in the oil per cent by weight__ | 0.1 |
| Activity of catalyst_____units__ | 4.5 |
| Hydrogen inlet rate_____C. F. M__ | 1.89 |
| Surplus hydrogen outlet rate_____C. F. M__ | 0.3 |
| Hydrogen pressure_____p. s. i.__ | 25 |
| Oil inlet temperature_____°C__ | 165 |
| Oil outlet temperature_____°C__ | 168 |
| Av. time of oil in hydrogenator___minutes__ | 4 |
| Total I. V. drop_____ | 52.2 |
| I. V. drop per minute, average_____ | 13 |

*Example 5.*—With the same apparatus as in Example 3, a lot of distilled fatty acids derived from a mixture of cottonseed and soybean foots, from the caustic refining of the crude oils, was hydrogenated to an iodine value of 74.9, under the following conditions:

| | |
|---|---|
| Fatty acid supply rate___pounds per min__ | 1.28 |
| Catalyst slurry rate_____do____ | .043 |
| Per cent Ni in catalyst slurry_____per cent__ | 2 |
| Amount of nickel addition per cent of wt. of fatty acids__ | 0.067 |
| Activity of catalyst_____units__ | 5.4 |
| Hydrogen inlet rate of flow_____C. F. M__ | 1.26 |
| Surplus hydrogen outlet rate_____C. F. M__ | 0.3 |
| Hydrogen pressure_____p. s. i.__ | 150 |
| Fatty acid inlet temperature _____°C__ | 163 |
| Fatty acid outlet temperature_____°C__ | 168 |
| Av. time of oil in hydrogenator_____min__ | 6.54 |
| Total I. V. drop_____ | 49.9 |
| I. V. drop per minute, average_____ | 7.53 |

In this example the catalyst, supplied from a separate tank, was slurried in neutral oil.

*Example 6.*—With the same apparatus as in Example 3, a lot of refined and bleached cottonseed oil was substantially fully hydrogenated to an iodine value of 1.6, under the following conditions:

| | |
|---|---|
| Oil supply rate_____pound per min__ | 0.92 |
| Catalyst slurry rate_____do____ | 0.04 |
| Per cent Ni in catalyst slurry_____ | 2 |
| Amount of nickel addition per cent of wt. of oil__ | 0.086 |
| Activity of catalyst_____units__ | 5.1 |
| Hydrogen inlet rate_____C. F. M__ | 1.716 |
| Surplus hydrogen outlet rate_____C. F. M__ | 0.3 |
| Hydrogen pressure_____p. s. i.__ | 200 |
| Oil inlet temperature_____°C__ | 165 |
| Oil outlet temperature_____°C__ | 167 |
| Av. time of oil in hydrogenator__minutes__ | 11 |
| Total I. V. drop_____ | 108.4 |
| I. V. drop per minute, average_____ | 9.9 |

Batch hydrogenation at the same temperature and with comparable catalyst, and at atmospheric pressure, requires at least 4 hours and usually 8 to 10 hours to hydrogenate cotton seed oil to such a low iodine value.

By reducing the hydrogenation time from a matter of hours to a matter of minutes we find that major savings are made in the cost of the hydrogen and in the cost of the catalyst required to process a given amount of oil. In batch hydrogenation it is common practice to pass much more hydrogen gas through the oil than is absorbed, in order to provide agitation. The surplus hydrogen is drawn out of the top of the hydrogenator and recirculated back to the entering supply of fresh gas. The recirculated surplus hydrogen gradually becomes contaminated with carbon monoxide which is generated as a result of thermal decomposition of the glyceride oil, and because carbon monoxide is a catalyst poison it becomes necessary either to pass the recirculated gas through a purification process for the removal of carbon monoxide, or to bleed a fraction of it to the atmosphere to keep its carbon monoxide content within bounds. Our process largely eliminates thermal decomposition of the oil being processed and thus avoids this difficulty of gas contamination.

In a somewhat analogous manner, our process large avoids the contamination of the catalyst with impurities with which it becomes associated during its contact with the oil. We find that catalyst used in our process has a much higher re-use value than catalyst similarly used in a slower but otherwise comparable batch process.

*Example 7.*—In a large hydrogenator similar to that illustrated in Figs. 2 to 6, having an internal diameter of 8 inches, an internal height of 97 inches, a free space of 2164 cubic inches,[1] and an agitator speed of 200 R. P. M., operated in the general manner of Example 1 except that the catalyst (slurried in oil) was fed separately into the hydrogenator and that purified hydrogen made by the steam iron process was used, a lot of refined and bleached cottonseed oil was hydrogenated under the following conditions:

| | |
|---|---|
| Oil supply rate_____pounds per hour__ | 350 |
| Catalyst slurry rate_____do____ | 7.56 |
| Per cent Ni in catalyst slurry_____ | 5.0 |
| Amount of Ni addition per cent of wt. of oil__ | 0.11 |
| Activity of catalyst_____units__ | 5.4 |
| Hydrogen inlet rate_____cubic ft./hr__ | 204 |
| Surplus hydrogen outlet rate__cubic ft./hr__ | 30 |
| Hydrogen pressure_____p. s. i__ | 150 |
| Oil inlet temperature_____°C__ | 89 |
| Oil outlet temperature_____°C__ | 92 |
| Av. time of oil in hydrogenator__minutes__ | 8.6 |
| Initial I. V._____ | 112 |
| Final I. V._____ | 77 |
| I. V. drop per minute, average_____ | 4.1 |

*Example 8.*—In the same hydrogenator as in Example 7, operated in the same general manner, a lot of refined and bleached cottonseed oil was hydrogenated under the following conditions:

| | |
|---|---|
| Oil supply rate_____pounds per hour__ | 1000 |
| Catalyst slurry rate_____do____ | 17.6 |
| Per cent Ni in catalyst slurry_____ | 2.5 |
| Amount of nickel addition per cent of wt. of oil__ | .044 |
| Activity of catalyst_____units__ | 5.0 |
| Hydrogen inlet rate_____C. F. H__ | 634 |
| Surplus hydrogen outlet rate_____C. F. H__ | 30 |
| Hydrogen pressure_____p. s. i__ | 50 |
| Oil inlet temperature_____°C__ | 160 |
| Oil outlet temperature_____°C__ | 167 |
| Av. time of oil in hydrogenator__minutes__ | 3 |
| Initial I. V._____ | 112.0 |
| Final I. V._____ | 69.5 |
| I. V. drop per minute, average_____ | 14.2 |

*Example 9.*—In the same hydrogenator as in Example 7, operated in the same general manner except that there was no bleed of surplus hydrogen, a lot of refined and bleached cottonseed oil was hydrogenated under the following conditions:

| | |
|---|---|
| Oil supply rate_____pounds per hour__ | 505 |
| Catalyst slurry rate_____do____ | 8.8 |
| Per cent Ni in catalyst slurry_____ | 5.0 |
| Amount of nickel addition per cent of wt. of oil__ | .087 |
| Activity of catalyst_____units__ | 4.7 |
| Hydrogen inlet rate_____C. F. H__ | 297 |
| Hydrogen pressure_____p. s. i__ | 100 |
| Oil inlet temperature_____°C__ | 106 |
| Oil outlet temperature_____°C__ | 103 |
| Av. time of oil in hydrogenator__minutes__ | 5.94 |
| Initial I. V._____ | 112.0 |
| Final I. V._____ | 70.6 |
| I. V. drop per minute, average_____ | 7.0 |

The hydrogenated products of Examples 7, 8 and 9, when mixed with minor proportions of

[1] About 78% of which is occupied by oil under average operating conditions.

"hard stock," deodorized, and plasticized, produced shortenings having excellent plastic properties and good keeping qualities. Whereas conventional batch hydrogenation causes a partial hydrolysis amounting to an increase of about .03% to 0.10% in the free fatty acid content of refined cottonseed oil hydrogenated to about 75 I. V., our continuous process causes scarcely any hydrolysis, raising the free fatty acid content only about 0.01%.

*Examples 10.*—With the same apparatus as in Example 1, except that there were eleven baffles, elements 60, and that a separate catalyst slurry tank was used, a lot of refined and bleached fish oil of 162.9 initial I. V. was hydrogenated under the conditions and with the results shown below:

| | |
|---|---|
| Oil supply rate_____pound per minute__ | 1.0 |
| Catalyst slurry rate_____do____ | 0.061 |
| Per cent Ni in catalyst slurry_____ | 2.0 |
| Amount of Ni addition per cent of wt. of oil__ | 0.16 |
| Activity of catalyst_____units__ | 4.4 |
| Hydrogen inlet rate_____C. F. M__ | 1.32 |
| Surplus hydrogen outlet rate_____C. F. M__ | 0.30 |
| Hydrogen pressure_____p. s. i__ | 250 |
| Oil inlet temperature_____°C__ | 157 |
| Oil outlet temperature_____°C__ | 173 |
| Av. time of oil in hydrogenator__minutes__ | 8.4 |
| Total I. V. drop_____ | 71.5 |
| I. V. drop per minute, average_____ | 8.5 |

The selection and control of the principal operating variables of the process will normally depend upon the nature of the material to be hydrogenated, upon the degree or extent of hydrogenation desired, and upon the particular characteristics desired in the finished product. Some of the considerations to be taken into account in deciding upon suitable values for some of the major controls are discussed in following paragraphs.

It is understood that the material to be hydrogenated and the hydrogen supply will normally be as free as is practicable from such impurities as would hinder the reaction. Freedom from compounds of sulfur is especially important, within limits readily attainable in current commercial practice.

The temperature to which the material to be hydrogenated is heated, preferably but not necessarily before it enters the hydrogenation reaction zone, is usually somewhere between 60° C. and 250° C., and the choice of a particular range between these broad extremes is of importance, depending upon the results desired. In the first place, we find that the employment of higher temperatures in our process very definitely causes the reaction to go at a faster rate, which is contrary to what one might expect from some of the statements to be found in the older literature on hydrogenation of glyceride oils. The effect of temperature upon reaction rate in our process is illustrated, in a typical case, by curve C of Fig. 7. Curve C represents the attainable hydrogenation rate with purified triglyceride oils in the iodine value range from 110 to 70, at a hydrogen gauge pressure of 150 pounds per square inch, using 0.1 per cent of nickel in promoted catalyst having an activity value of 5.

In the second place, the temperature at which the hydrogenation takes place influences the net result of the several reactions (some of which occur simultaneously and some consecutively) involved in the partial hydrogenation of a typical vegetable oil, which is a complex mixture of mixed triglycerides. In the partial hydrogenation of oils containing a plurality of double bonds, such as cottonseed oil for example, these reactions include the conversion of linoleic acid radicals to normal oleic and to different ones of the isooleic acid radicals, and the conversion of these to stearic, as well as side reactions involving the isomerization of linoleic and of oleic acid radicals under the influence of the high temperatures. As is fairly well known, higher temperatures favor "selectivity," which is the preferential reaction of hydrogen with fatty acid radicals containing polyethylenic linkages over its reaction with fatty acid radicals containing monoethylenic linkages, this "selectivity" being a desirable result of using high temperatures. At the same time, an undesirable result is obtained in that higher temperatures, to some extent above 100° C. and to a very pronounced extent above 180° C., favor the formation of isooleic acid radicals.

A third effect of higher temperatures is the injury to high quality which may arise as a result of thermal breakdown under the conditions of the process.

The choice of temperature in hydrogenating unsaturated oleaginous materials thus becomes largely a matter of balancing the gains resulting from higher reaction rates and greater selectivity at higher temperatures against the accompanying increase in isooleic acid radicals (if the material is to be only partially hydrogenated) and such other damage as may be due to high temperature alone.

The pressure of the gas phase in the present process when substantially pure hydrogen is employed, or the partial pressure of the hydrogen in the gas phase when hydrogen-containing gases are used, will preferably be between about 10 pounds per square inch and about 150 pounds per square inch, measured at the gas inlet to the reaction zone. Somewhat lower pressures than 10 pounds may be used if the combination of other factors is such as to favor high reaction rates. Pressures up to 500 pounds or even higher may be employed if desired, particularly when a high degree of hydrogenation is sought. Pressures in the extremely high range are, however, undesirable in partially hydrogenating a glyceride fat when the maximum degree of selectivity is desired. Pressures above atmospheric, from about 15 pounds up to about 150 pounds per square inch, are preferred when making a plastic shortening from triglyceride fats. Within this range increasing the pressure does not greatly impair "selection" and does very noticeably increase the reaction rate, perhaps because the increased pressure facilitates keeping an adequate supply of hydrogen dissolved in the liquid which is being hydrogenated and thus renders the hydrogen readily available for the reaction, and perhaps also because the increased pressure increases the concentration of hydrogen on the catalyst surface. At a hydrogenation temperature of 165° C., for example, a hydrogen pressure of 150 pounds per square inch will normally cause a rate of hydrogenation two to three times the rate at 30 pounds per square inch, all other controls being equal.

One of the more obvious factors of the combination of factors which we have found to be essential for our abnormally rapid reaction rate is a catalyst of high activity. We prefer a catalyst having an activity of at least four units on the scale of values which is explained in the next paragraph, and we have normally employed a catalyst having an activity of about five units. Catalysts composed principally of nickel, promoted if desired by metals (or their oxides) such as copper, chromium, cobalt, zirconium, thorium, or other known catalyst promoters, are preferred. Metal sulfide catalysts have not been found satisfactory for use in our process.

To determine the activity of nickel-containing hydrogenation catalysts in comparable numerical terms, a representative sample of the catalyst is employed to hydrogenate cottonseed oil under carefully standardized conditions and the resulting drop in the butyro-refractive index of the oil is reported as the activity value of the catalyst. For this test a long-neck flat-bottom glass flask of 260 milliliter body capacity may be employed as the hydrogenation vessel, this flask being fitted with a cork through which pass the stem of a thermometer whose bulb is immersed in the oil in the flask, a close fitting bearing for an agitator shaft, a metallic tube for the introduction of hydrogen leading down and around the agitator and terminating directly under and pointing upward towards the center of the agitator, and a metallic tube to serve as an outlet for excess hydrogen. The agitator consists of a horizontal one inch length of steel tubing having a one-eighth inch bore, welded at its mid point to the lower extremity of a vertical steel agitator shaft and having a one-eighth inch hole drilled through its wall at a point diametrically opposite and below its point of attachment to this shaft. The agitator clears the bottom of the flask by about one and one-fourth inches, and its shaft is directly connected to a motor which operates at $3500 \pm 200$ R. P. M. A vertical baffle may be employed if needed to prevent a vortex effect such as might reduce the effectiveness of the agitation. The hydrogen outlet tube leads to the lower portion of a small bottle which is about three fourths filled with cottonseed oil. For the purposes of this test one needs a cylinder of compressed electrolytic hydrogen, a supply of kieselguhr equivalent in quality to Johns-Manville's Celite guhr, grade FC (or other good grade guhr known to be acceptable in glyceride oil hydrogenation) and a supply of good grade recently refined and bleached cottonseed oil. This oil should be fully refined with caustic, and preferably re-bleached in the laboratory for 5 minutes with 6% of a good grade of fuller's earth (such as General Reduction Company's Carlton or Pike's Peak earth) at 105° C., followed by filtration. The flask is charged with 200 grams of this oil, and to this are added an amount of the catalyst which contains just 0.20 gram of nickel, and 0.80 gram of the guhr. The contents of the flask are mixed and a few grams are filtered and the refractive index of the filtrate is measured. The flask is then placed in an oil bath which entirely surrounds its body and extends at least an inch below the flask bottom, and the cork and accompanying assembly of tubes, agitator, and thermometer is inserted in the neck of the flask. The flask and its contents are then heated to 100° C. with no agitation except for a slow stream of hydrogen bubbling through the oil. When 100° C. is reached the agitator is started and the hydrogen flow is increased to 0.08 cubic foot per minute, measured at standard conditions. These hydrogenating conditions are maintained for exactly 30 minutes, whereupon the source of heat is removed, the agitator shut off, and the hydrogen flow stopped. A refractive index measurement is made on a small filtered sample of the hydrogenated oil. The difference between the two refractive index measurements, in butyro refractometer units, is reported as the activity value of the catalyst. Scrupulous cleanliness of the equipment used in this test, and avoidance of the use of rubber in any contact with the oil, are recommended. A preliminary run under the conditions of the test but without refractive index measurements, is found to be a good means of conditioning the equipment for use in the test in order to insure reproducible results.

It is well known that, up to a certain point, the overall rate of absorption of hydrogen during the hydrogenation reaction depends on the amount of catalyst surface exposed to the liquid being hydrogenated, provided an adequate hydrogen supply is maintained (and we believe that this calls for maintaining an adequate supply of hydrogen dissolved in the liquid being hydrogenated). We find that for many practical purposes an amount of catalyst equivalent to a weight of nickel amounting to from 0.03 per cent to 0.10 per cent of the weight of the liquid to be hydrogenated is sufficient when using a catalyst having an activity of about 4 to 6 units. Under most practical conditions there is not much advantage in exceeding 0.20 per cent of nickel with a catalyst of this activity range because other factors, such as available dissolved hydrogen supply, then tend to become limiting.

A very high degree of agitation is of paramount importance in obtaining the full benefits from the present process. We have found that the use of even large amounts of very active catalyst together with high temperatures and high pressures do not enable one to obtain desirably high reaction rates unless one also provides violent mechanically induced agitation. We prefer direct mechanical agitation by means of moving agitator blades, although an equivalent result may be obtained in a reaction vessel which contains no moving mechanical parts but which is provided with means for introducing a fluid reactant, either the gas or the liquid, or both, in one or more high velocity jets. It is our belief that the agitation should be so violent as to cause rapid movement of the liquid interface relative to the solid interface at the surface of each catalyst particle, as contrasted with a condition in which the liquid interface on the solid particle is relatively stationary or stagnant, and also that the agitation should be such as to break up the gas bubbles to such a great extent as to facilitate continuous renewal of the supply of hydrogen dissolved in the liquid as this supply is rapidly used up in the course of the reaction. Good agitation of this sort is provided in the apparatus illustrated in the drawings when the clearance between the rotors and the stators does not exceed about three sixteenths or one fourth of an inch and when the peripheral speed of the outer edges of the rotors is of the order of six feet per second. The use of stators to retard the swirling action of the liquid, which would otherwise be induced by the rotating agitators, is important particularly in order to avoid a centrifugal effect which would tend to move the suspended catalyst towards the outer walls of the vessel and would simultaneously tend to move the gas bubbles towards the center of the vessel.

A'though preferred minimum limits have been mentioned in connection with several of the foregoing process controls very satisfactory results have been obtained when the value of one control or another has been somewhat lower than its preferred minimum value, provided the combination of other factors was such as to favor a high reaction rate.

It is appropriate at this point to consider several important features in the design of hydrogenation vessels suitable for use in our process. Our requirements of a continuous and simultaneous inflow and outflow of the oil being treated, under the conditions of extreme turbulence caused by the violent agitation, would surely result in serious contamination of the finished hydrogenated product with raw material or only partially processed material if one used hydrogenation vessels resembling many of those heretofore used or proposed. It has been found that this highly objectionable result may be satisfactorily avoided by either of two alternative expedients—and preferably by a combination of both of them—each tending to retard movement of insufficiently hydrogenated material through and out of the hydrogenator.

The first expedient is to employ a reaction chamber which is relatively quite long, from entrance to exit, and which thus permits the employment of a relatively large number of successive sets of transverse agitators, interspersed with successive sets of stator blades, whereby the flow of material from inlet to outlet is repeatedly interrupted.

The second expedient is to subdivide the reaction zone into a series of interconnecting lesser zones, the interconnecting passages being so greatly restricted in cross sectional area that the agitation occurring in one of these zones is not felt to an appreciable extent in the adjoining zone. Our circular baffles, 60, which leave an annular passage around the shaft just one-eighth of an inch wide in a hydrogenator having an internal diameter of 8 inches and a shaft diameter of 4 inches, accomplish this purpose.

The horizontal circular baffles, elements 60, although preferred features of the hydrogenation vessel, may if desired be omitted entirely. In this event "channeling" of insufficiently hydrogenated material to the outlet is to a large extent avoided, although not to the full extent preferred for some purposes, when the length of the chamber from inlet to outlet is such as to permit the employment of at least 10 to 15 separate sets of agitators, each set separated from the next by a cooperating set of stator blades.

By providing the mechanical agitation in a direction which is predominantly transverse (preferably perpendicular or even somewhat counter) to the main direction of flow of the liquid being hydrogenated, the agitator-impelled transfer of unprocessed raw material towards the outlet of the vessel is minimized. This may be accomplished by aligning the pressure resisting surfaces of the agitator blades and of the stator blades so that they face in a direction generally transverse to, and not tending towards, the general direction of liquid flow. While the blade surfaces thus define planes substantially parallel to the general direction of liquid flow, slight inclination is of course permissible, and inclination tending to retard axial flow may in some cases be desirable.

When the chief reliance for the avoidance of "channeling" is placed in horizontal baffles such as elements 60, with a minimum of agitator blades—i. e. when each of the lesser zones between two horizontal baffles is provided with just one set of tranverse agitators—"channeling" is to a large extent avoided, although perhaps not to the full extent preferred for some purposes, by thus subdividing the hydrogenation space into at least six lesser zones.

The essence of our invention resides in our discovery of highly economical conditions for bringing about extremely fast reaction rates in the continuous hydrogenation of unsaturated higher fatty acids and their esters in a manner permitting accurate end-point control and the production of hydrogenated fatty materials having exceptional quality advantages.

Precise minimum limits for the reaction rates to be expected from our process cannot be established, because of the wide ranges of operable conditions as set forth above, and also because of difficultly controllable variables such as the well nigh unavoidable presence of traces of various impurities in the reactants. Furthermore the reaction rate slows down as complete saturation is approached. Another complication arises in the hydrogenation of acid substances, such as higher fatty acids, in that the catalyst activity decreases upon contact with these materials, thus reducing the apparent reaction rate as judged in terms of the initial catalyst activity. Despite these handicaps it seems desirable to provide at least a rough guide to indicate the minimum rate of hydrogenation to be expected when operating our process with different materials and at different temperature levels.

In general, the amount and activity of the catalyst, the purity of the oily liquid and the gas, the hydrogen pressure, and the effectiveness of the agitation should be such as to produce at least as high a reaction rate as that indicated by curve A of Figure 7 for the particular temperature employed, provided the material being hydrogenated has been well purified, is substantially non-acidic, and has an iodine value above 20 at the time its reaction rate is measured. When conditions are less favorable, as when the material is less highly purified, or is wholly acidic in nature, or is below 20 in iodine value the reaction rate may be no more than about half as great, as represented by curve B. Under intermediate conditions, as when hydrogenating a moderately purified oil containing some free fatty acid, an appropriate point may be found between curves A and B, on a vertical line corresponding to the temperature employed, as a rough measure of the minimum rate to be expected.

The maintenance of uniformity of the temperature in the material being hydrogenated, as it flows through the reaction zone, is called into play when close end point control (e. g. control of final iodine value or refractive index) is desired and when the amount of heat generated by the reaction is so great, and its rate of generation so rapid, that it would cause an uncontrolled increase in the reaction rate in the absence of temperature control. From this point of view the critical amount of heat generation corresponds to an overall iodine value drop of about 10 units (enough to raise the reaction temperature about 40° C. if not controlled), especially whenever the average hydrogenation rate is above that corresponding to an iodine value drop of 1½ units per minute.

The hydrogenator used in our process is designed to provide for efficient removal from the reactants of large quantities of heat, since the heat generated by the reaction amounts to about 2 B. t. u. per pound of oil hydrogenated per unit of iodine value drop. Thus the rate of heat development in Example 5, wherein 1015 pounds of oil are hydrogenated per hour to a 42.5 I. V. drop, amounts to about 86,000 B. t. u. per hour. In the hydrogenator illustrated in the drawings, the heat transfer surface is large in relation to the cubical contents of the vessel, and the heat transfer coefficient is high because of the violent agitation.

When our process is employed to saturate substantially completely the unsaturated carbon to carbon bonds of an oil, we prefer to employ temperatures above 150° C. and preferably not much over 250° C., and hydrogen pressures above 150 pounds pressure.

The adjective "higher" as applied to fatty acids and fatty esters in this specification denotes those members of these series having eight or more, and usually not over about 24, carbon atoms in the fatty acid chain.

Having thus described our invention, what we claim and desire to secure by Letters Patent is:

1. The continuous process of hydrogenating unsaturated higher fatty acids and esters thereof to a less unsaturated state, which comprises the steps of: (1) flowing the unsaturated material at a temperature between 60° C. and 250° C. into, through, and (at a point remote from the inlet) out of a confined hydrogenation zone, and continuously introducing hydrogen gas into said zone under a controlled superatmospheric pressure not exceeding 500 pounds per square inch; (2) maintaining mechanically induced violent agitation of a turbulent character in each of at least 4 separated adjoining localities along the path of said material within said zone, thereby promoting highly effective contacting of all reactants while simultaneously restricting movement of the material intermediate said localities to retard the flow of insufficiently hydrogenated material through and out of said zone; and (3) establishing, with the aid of a continuously introduced supply of highly active finely divided nickel-containing catalyst, a hydrogenation rate averaging at least as great as that represented by the point on curve B of Figure 7 which corresponds to the hydrogenation temperature employed.

2. The process of claim 1, in which the material being hydrogenated is retained in the hydrogenation zone until its carbon to carbon double bonds are substantially fully saturated, and in which the heat generated by the hydrogenation reaction is allowed to remain in the reaction mixture and to raise its temperature.

3. The process of claim 1 in which the unsaturated material is purified fatty acid esters and in which the rate of hydrogenation is established at least as great as that represented by the point on curve A of Figure 7 which corresponds to the hydrogenation temperature employed.

4. The process of claim 3, in which the reaction is continued until the iodine value of the material has decreased at least 10 units, and is stopped while the iodine value is above 20, and in which the heat generated by the hydrogenation reaction is substantially removed from the reaction mixture as fast as it is generated, thereby preventing a temperature rise in said reaction mixture of more than about 15° C.

5. The process of claim 1, in which the catalyst has an activity value of at least 4.

6. The process of claim 1, in which the several adjoining localities of agitation are connected with one another by passages of greatly reduced cross-sectional area.

7. The process of claim 6, in which the adjoining localities of agitation are at least six in number.

VICTOR MILLS.
JUDSON HAIR SANDERS.
HAROLD K. HAWLEY.

REFERENCES CITED

The following references are of record in the file of this patent:

UNITED STATES PATENTS

| Number | Name | Date |
|---|---|---|
| 1,856,120 | Valentine | May 3, 1932 |
| 2,163,602 | Jenness | June 27, 1939 |
| 2,163,603 | Jenness | June 27, 1939 |
| 2,164,291 | Jenness | June 27, 1939 |
| 2,339,234 | Turck | Nov. 20, 1945 |